(12) United States Patent
Zou

(10) Patent No.: US 12,085,703 B2
(45) Date of Patent: Sep. 10, 2024

(54) PHYSICAL CALIBRATION SLIDE

(71) Applicant: Leica Biosystems Imaging, Inc., Vista, CA (US)

(72) Inventor: Yunlu Zou, Vista, CA (US)

(73) Assignee: Leica Biosystems Imaging, Inc., Vista, CA (US)

(*) Notice: Subject to any disclaimer, the term of this patent is extended or adjusted under 35 U.S.C. 154(b) by 244 days.

(21) Appl. No.: 17/309,733

(22) PCT Filed: Aug. 6, 2020

(86) PCT No.: PCT/US2020/045178
§ 371 (c)(1),
(2) Date: Jun. 16, 2021

(87) PCT Pub. No.: WO2021/026338
PCT Pub. Date: Feb. 11, 2021

(65) Prior Publication Data
US 2022/0155578 A1 May 19, 2022

Related U.S. Application Data

(60) Provisional application No. 62/883,585, filed on Aug. 6, 2019.

(51) Int. Cl.
G02B 21/34 (2006.01)
G01N 1/28 (2006.01)
G01N 1/32 (2006.01)

(52) U.S. Cl.
CPC .............. *G02B 21/34* (2013.01); *G01N 1/32* (2013.01); *G01N 2001/2893* (2013.01)

(58) Field of Classification Search
CPC ............. G02B 21/34; G01N 1/32; G01N 1/00
See application file for complete search history.

(56) References Cited

U.S. PATENT DOCUMENTS

H2114 H * 2/2005 Novak ................ G01B 9/00
356/124
2015/0138623 A1* 5/2015 Graves ............... G02B 26/0833
359/290

(Continued)

FOREIGN PATENT DOCUMENTS

WO  WO 99/00689   1/1999
WO  WO 2017/109175  6/2017

OTHER PUBLICATIONS

"Resolution Test Targets" by Thorlabs, pp. 1-7; Wayback Machine archive shows from 2015 https://web.archive.org/web/20150401161050/http:/www.thorlabs.com/newgrouppage9.cfm?objectgroup_id=4338 (Year: 2015).*

(Continued)

*Primary Examiner* — Edmond C Lau
*Assistant Examiner* — Joshua M Carlson
(74) *Attorney, Agent, or Firm* — Frost Brown Todd LLP

(57) ABSTRACT

Physical calibration slide comprising a plurality of etched features. The etched features may comprise two or more of a slanted Ronchi ruling feature comprising at least one set of parallel lines that are slanted with respect to a long and short axis of the slide, a straight Ronchi ruling feature comprising at least one set of parallel lines that are parallel to either the long or short axis, a star target feature comprising a circle with a plurality of wedge pairs, a crosshair feature comprising at least one crosshair, a clear area, a letter-O feature comprising a circle, a resolution target feature comprising one or more resolution targets, a bullseye feature comprising a two-dimensional array of bullseyes, a triangle feature comprising at least one isosceles triangle, or a symmetric corers feature comprising two symmetric sets of geometric shapes arranged in an L-shape.

18 Claims, 15 Drawing Sheets

(56) References Cited

U.S. PATENT DOCUMENTS

| | | | | |
|---|---|---|---|---|
| 2015/0176980 A1* | 6/2015 | Jensen | .................. | H01L 21/681 356/244 |
| 2016/0080737 A1* | 3/2016 | Tezaur | .................. | H04N 17/002 348/188 |

OTHER PUBLICATIONS

"Richardson Test Slide Gen III" by Richardson Technologies Inc., pp. 1-4 (Year: 2004).*

Anonymous: "Thorlabs—R1L3S5P Auto Cad", Jan. 1, 2014 (Jan. 1, 2014), XP055741688, Retrieved from the Internet: URL:https://www.thorlabe.de/drawings/2b43558ba54b0e9c-AF65D82B-09C7-EED7-A7F926E49D34E51F/R1L3S5P-AutoCADPDF.pdf.

Anonymous: "Thorlabs—R1L3S5P Positive Combined Resolution and Distortion Test Target, 3"×1"" Nov. 26, 2013 (Nov. 26, 2013), XP055741685, Retrieved from the Internet: URL:https://www.thorlabs.de/thorproduct.cfm?partnumber=R1L3S5P.

Anonymous: "Thorlabs—R2L2S2P Slant Edge MTF Target, 2"×2"", Nov. 26, 2013 (Nov. 26, 2013), XP055741846, Retrieved from the Internet: URL:https://www.thorlabs.de/thorproduct.cfm?partnumber=R2L2S2P.

Qtn004354-S01 November et al: " "×3" Combined Resolution and Distortion Test Target R1L3S5P" Nov. 13, 2019 (Nov. 13, 2019), pp. 203-228, XP055741691, Retrieved from the Internet: URL:https://www.thorlabs.de/drawings/2b43558ba54b0e9c-AF65D82B-09C7-EED7-A7F926E49D34E51F/R1L3S5P-SpecSheet.pdf.

Thorlabs: "Thorlabs life science product portfolio—Resolution Test Targets", Oct. 1, 2014 (Oct. 1, 2014), pp. 324-328, XP055741650, Retrieved from the Internet: URL:https://www.thorlabs.com/images/Catalog/Imaging/Thorlabs_Life_Science_Catalog.pdf.

International Search Report issued in application No. PCT/US2020/045178, dated Oct. 29, 2020.

Aperio GT 450, screenshot of Google image search results, accessed on Jan. 17, 2019.

Leica Biosystems: "Leica Aperio GT 450 RUO", uploaded Jul. 30, 2019, retrieved from the internet <https://vimeo.com/350887835>, accessed Sep. 8, 2022.

* cited by examiner

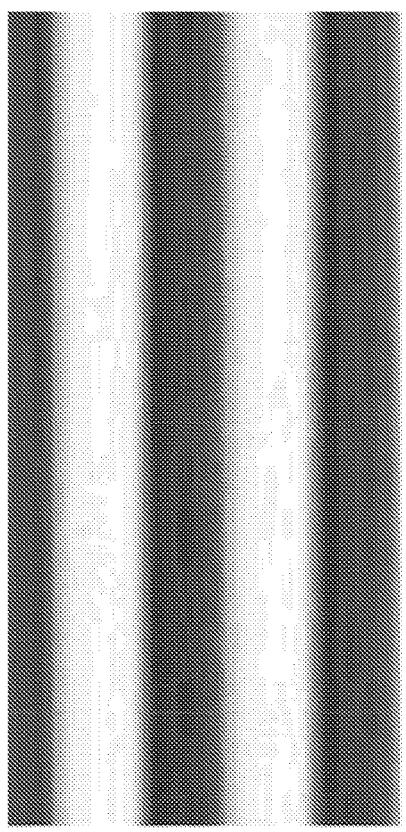
FIG. 4C
FIG. 4D
Scan Direction
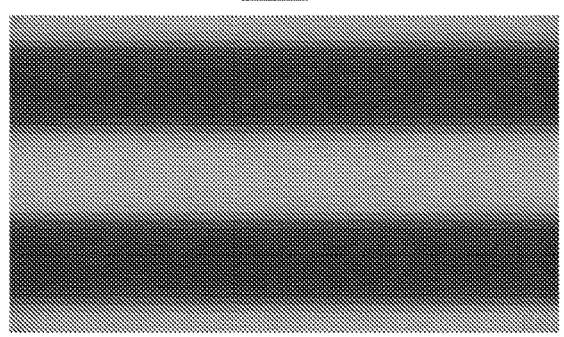
Correct Scan Speed
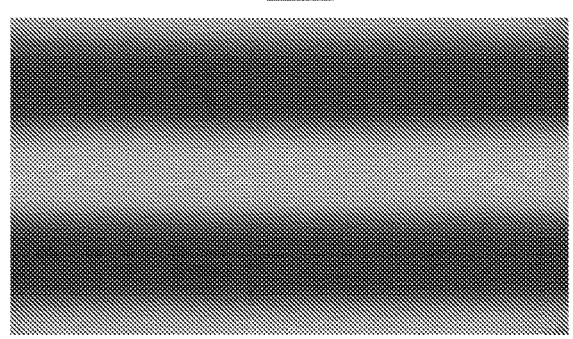
Wrong Scan Speed FIG. 5A
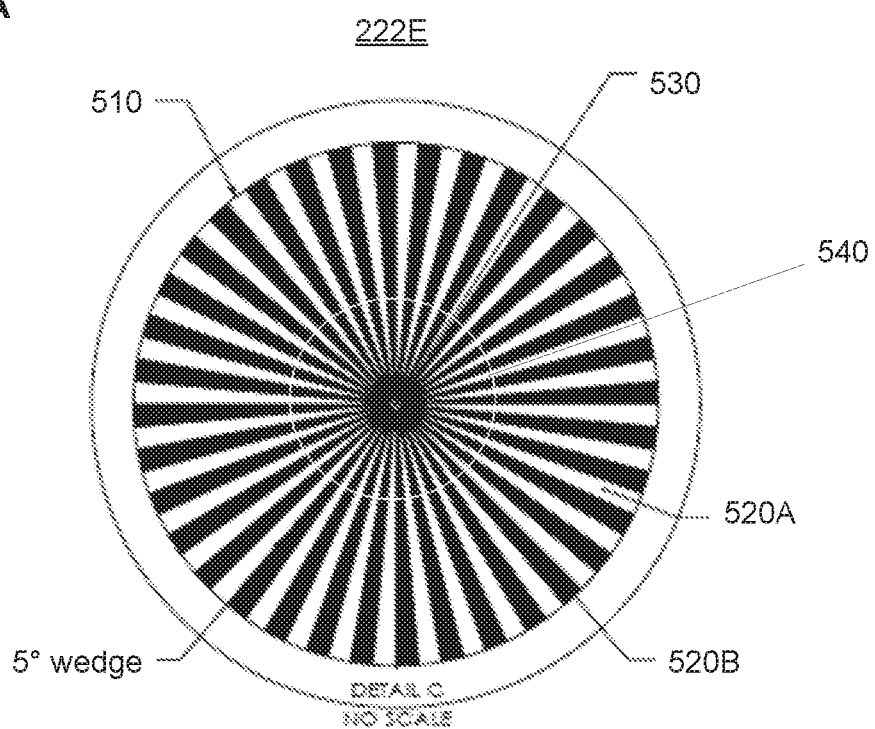
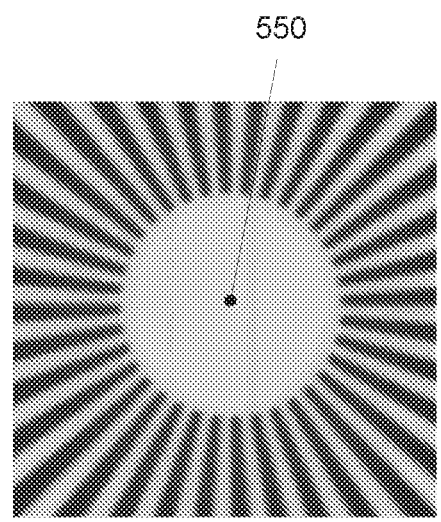
FIG. 5B FIG. 9B
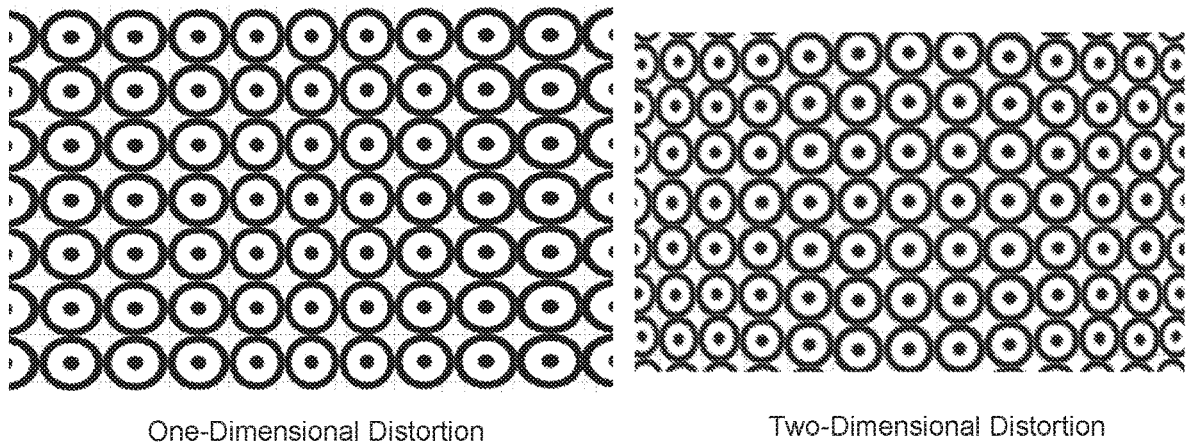
One-Dimensional Distortion
Two-Dimensional Distortion
Up-and-Down Stitching Error
Left-and-Right Stitching Error
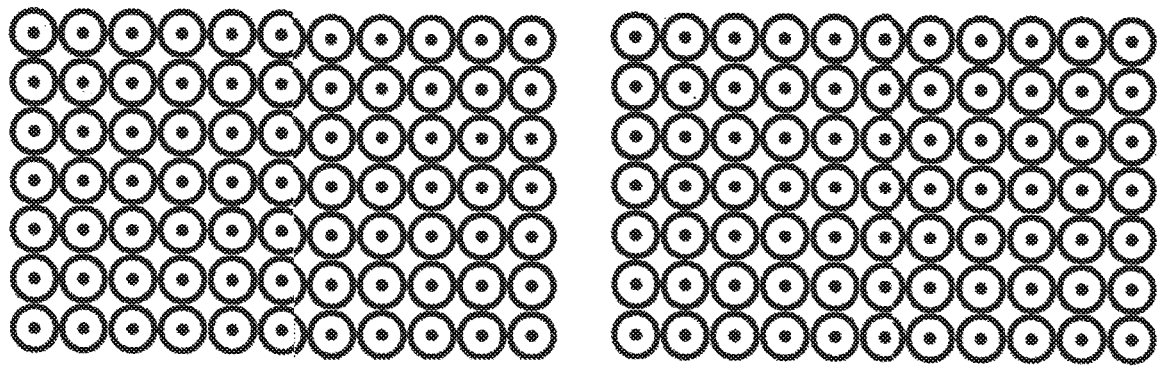
FIG. 9C

PHYSICAL CALIBRATION SLIDE

CROSS-REFERENCE TO RELATED APPLICATIONS

The present application claims priority to U.S. Provisional Patent App. No. 62/883,585, filed Aug. 6, 2019, which is hereby incorporated herein by reference as if set forth in full.

In addition, the present application is related to the following applications, which are all hereby incorporated herein by reference as if set forth in full:

International Patent App. No. PCT/US2016/053581, filed Sep. 23, 2016;
International Patent App. No. PCT/US2017/028532, filed Apr. 20, 2017;
International Patent App. No. PCT/US2018/063456, filed Nov. 30, 2018;
International Patent App. No. PCT/US2018/063460, filed Nov. 30, 2018;
International Patent App. No. PCT/US2018/063450, filed Nov. 30, 2018;
International Patent App. No. PCT/US2018/063461, filed Nov. 30, 2018;
International Patent App. No. PCT/US2018/062659, filed Nov. 27, 2018;
International Patent App. No. PCT/US2018/063464, filed Nov. 30, 2018;
International Patent App. No. PCT/US2018/054460, filed Oct. 4, 2018;
International Patent App. No. PCT/US2018/063465, filed Nov. 30, 2018;
International Patent App. No. PCT/US2018/054462, filed Oct. 4, 2018;
International Patent App. No. PCT/US2018/063469, filed Nov. 30, 2018;
International Patent App. No. PCT/US2018/054464, filed Oct. 4, 2018;
International Patent App. No. PCT/US2018/046944, filed Aug. 17, 2018;
International Patent App. No. PCT/US2018/054470, filed Oct. 4, 2018;
International Patent App. No. PCT/US2018/053632, filed Sep. 28, 2018;
International Patent App. No. PCT/US2018/053629, filed Sep. 28, 2018;
International Patent App. No. PCT/US2018/053637, filed Sep. 28, 2018;
International Patent App. No. PCT/US2018/062905, filed Nov. 28, 2018;
International Patent App. No. PCT/US2018/063163, filed Nov. 29, 2018;
International Patent App. No. PCT/US2017/068963, filed Dec. 29, 2017;
International Patent App. No. PCT/US2019/020411, filed Mar. 1, 2019;
U.S. patent application Ser. No. 29/631,492, filed Dec. 29, 2017;
U.S. patent application Ser. No. 29/631,495, filed Dec. 29, 2017;
U.S. patent application Ser. No. 29/631,499, filed Dec. 29, 2017; and
U.S. patent application Ser. No. 29/631,501, filed Dec. 29, 2017.

BACKGROUND

The embodiments described herein are generally directed to calibration, and, more particularly, to a physical calibration slide that can be used to calibrate a slide scanning system.

SUMMARY

A physical calibration slide is disclosed. In an embodiment, the physical calibration slide has a long axis along a long side and short axis along a short side, and comprises a plurality of etched features, wherein the plurality of etched features comprises two or more of: a slanted Ronchi ruling feature comprising at least one set of parallel lines that are slanted with respect to the long axis and the short axis; a straight Ronchi ruling feature comprising at least one set of parallel lines that are parallel to either the long axis or the short axis; a star target feature comprising a circle with a plurality of wedge pairs, wherein each of the plurality of wedge pairs comprises an etched wedge and a non-etched wedge; a crosshair feature comprising at least one crosshair; a clear area; a letter-O feature comprising a circle; a resolution target feature comprising one or more resolution targets; a bullseye feature comprising a two-dimensional array of bullseyes; a triangle feature comprising at least one isosceles triangle; or a symmetric corners feature comprising two symmetric sets of geometric shapes arranged in an L-shape. In one implementation, the physical calibration slide comprises each of the slanted Ronchi ruling, the straight Ronchi ruling, the star target feature, the crosshair feature, the letter-O feature, the resolution target feature, the bullseye feature, the triangle feature, and the symmetric corners feature. The physical calibration slide may have a width of 25 mm and a length of 75 mm. The plurality of features may be etched from chromium.

The slanted Ronchi ruling feature may comprise a first set of parallel lines that are slanted at a first angle with respect to the short axis, and a second set of parallel lines that are slanted at a second angle with respect to the short axis that is different than the first angle. The first angle may be 95°, and wherein the second angle may be 5°.

The straight Ronchi ruling feature may comprise a first set of parallel lines that are parallel to the long axis, and a second set of parallel lines that are parallel to the short axis and orthogonal to the first set of parallel lines.

In the star target feature, the circle may comprise an etched core with a central dot. The star target feature may comprise an inner circle within an outer circle.

The crosshair feature may comprise a centered crosshair and an offset crosshair that is smaller than the centered crosshair, wherein the centered crosshair represents a center of a coordinate system of the plurality of features. The crosshair feature may further comprise a rectangular box around the centered crosshair and the offset crosshair, wherein the centered crosshair is centered within the rectangular box.

The resolution target feature may comprise a plurality of resolution targets for macro and micro focusing. One or more of the plurality of resolution targets may be surrounded by a circle.

In the bullseye feature, the two-dimensional array of bullseyes may comprise a 1,000×1,000 array of bullseyes, wherein each bullseye comprises a circle with a dot in a center of the circle.

The triangle feature may comprise a 45° isosceles triangle.

In the symmetric corners feature, the geometric shapes may comprise dots. In the symmetric corners feature, the geometric shapes may comprise squares. In the symmetric corners feature, each set of geometric shapes may comprise a largest shape and two or more smaller shapes extending in two orthogonal directions from the largest shape, wherein the two or more smaller shapes in each direction decrease in size from closest to farthest from the largest shape.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 4B-4E illustrate various tests using the straight Ronchi rulings feature, according to various embodiments;

FIGS. 5A and 5B illustrate a star target feature, according to various embodiments;

FIGS. 9B-9E illustrate various tests using the bullseye feature, according to various embodiments;

DETAILED DESCRIPTION

Embodiments of a physical calibration slide for calibrating a scanning system are described herein. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Scanning System

Figure 1A:
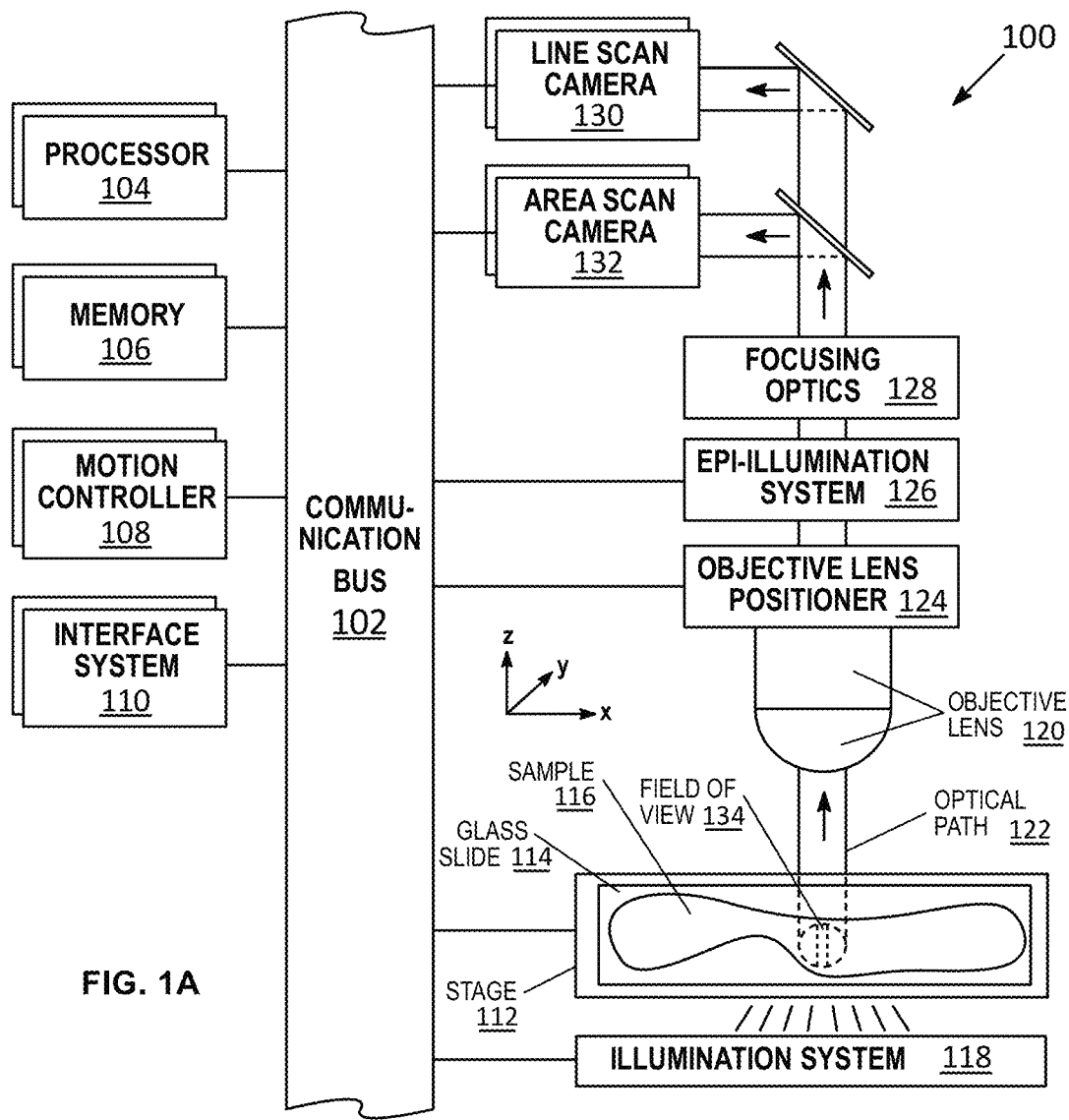
FIG. 1A illustrates an example processor-enabled device that may be used in connection with the various embodiments described herein, according to an embodiment.

FIG. 1A is a block diagram illustrating an example processor-enabled slide-scanning system 100 that may be used in connection with various embodiments described herein. Alternative forms of scanning system 100 may also be used as will be understood by the skilled artisan. In the illustrated embodiment, scanning system 100 is presented as a digital imaging device that comprises one or more processors 104, one or more memories 106, one or more motion controllers 108, one or more interface systems 110, one or more movable stages 112 that each support one or more glass slides 114 with one or more samples 116, one or more illumination systems 118 that illuminate sample 116, one or more objective lenses 120 that each define an optical path 122 that travels along an optical axis, one or more objective lens positioners 124, one or more optional epi-illumination systems 126 (e.g., included in a fluorescence-scanning embodiment), one or more focusing optics 128, one or more line-scan cameras 130, and/or one or more area-scan cameras 132, each of which define a separate field of view 134 on sample 116 and/or glass slide 114. The various elements of scanning system 100 are communicatively coupled via one or more communication busses 102. Although there may be a plurality of each of the various elements of scanning system 100, for simplicity in the description that follows, these elements will be described in the singular, except when needed to be described in the plural to convey the appropriate information.

Processor 104 may include, for example, a central processing unit (CPU) and a separate graphics processing unit (GPU) capable of processing instructions in parallel, or a multicore processor capable of processing instructions in parallel. Additional separate processors may also be provided to control particular components or perform particular functions, such as image processing. For example, additional processors may include an auxiliary processor to manage data input, an auxiliary processor to perform floating-point mathematical operations, a special-purpose processor having an architecture suitable for fast execution of signal-processing algorithms (e.g., digital-signal processor), a slave processor subordinate to the main processor (e.g., back-end processor), an additional processor for controlling line-scan camera 130, stage 112, objective lens 120, and/or a display (e.g., a console comprising a touch panel display integral to scanning system 100). Such additional processors may be separate discrete processors or may be integrated into a single processor.

Memory 106 provides storage of data and instructions for programs that can be executed by processor 104. Memory 106 may include one or more volatile and/or non-volatile computer-readable storage mediums that store the data and instructions. These mediums may include, for example, random-access memory (RAM), read-only memory (ROM), a hard disk drive, a removable storage drive (e.g., comprising flash memory), and/or the like. Processor 104 is configured to execute instructions that are stored in memory 106, and communicate via communication bus 102 with the various elements of scanning system 100 to carry out the overall function of scanning system 100.

Communication bus 102 may be configured to convey analog electrical signals and/or digital data. Accordingly, communications from processor 104, motion controller 108, and/or interface system 110, via communication bus 102, may include both electrical signals and digital data. Processor 104, motion controller 108, and/or interface system 110 may also be configured to communicate with one or more of the various elements of scanning system 100 via a wireless communication link.

Motion control system 108 is configured to precisely control and coordinate X, Y, and/or Z movement of stage 112 (e.g., within an X-Y plane), X, Y. and/or Z movement of objective lens 120 (e.g., along a Z axis orthogonal to the X-Y plane, via objective lens positioner 124), rotational movement of a carousel described elsewhere herein, lateral movement of a push/pull assembly described elsewhere herein, and/or any other moving component of scanning system 100. For example, in a fluorescence-scanning embodiment comprising epi-illumination system 126, motion control system 108 may be configured to coordinate movement of optical filters and/or the like in epi-illumination system 126.

Interface system 110 allows scanning system 100 to interface with other systems and human operators. For example, interface system 110 may include a console (e.g., a touch panel display) to provide information directly to an operator via a graphical user interface and/or allow direct input from an operator via a touch sensor. Interface system 110 may also be configured to facilitate communication and data transfer between scanning system 100 and one or more external devices that are directly connected to scanning system 100 (e.g., a printer, removable storage medium, etc.), and/or one or more external devices that are indirectly connected to scanning system 100, for example, via one or more networks (e.g., an image storage system, a Scanner Administration Manager (SAM) server and/or other administrative server, an operator station, a user station, etc.).

Illumination system 118 is configured to illuminate at least a portion of sample 116. Illumination system 118 may include, for example, one or more light sources and illumination optics. The light source(s) could comprise a variable intensity halogen light source with a concave reflective mirror to maximize light output and a KG-1 filter to suppress heat. The light source(s) could comprise any type of arc-lamp, laser, or other source of light. In an embodiment, illumination system 118 illuminates sample 116 in transmission mode, such that line-scan camera 130 and/or area-scan camera 132 sense optical energy that is transmitted through sample 116. Alternatively or additionally, illumination system 118 may be configured to illuminate sample 116 in reflection mode, such that line-scan camera 130 and/or area-scan camera 132 sense optical energy that is reflected from sample 116. Illumination system 118 may be configured to be suitable for interrogation of sample 116 in any known mode of optical microscopy.

In an embodiment, scanning system 100 includes an epi-illumination system 126 to optimize scanning system 100 for fluorescence scanning. It should be understood that, if fluorescence scanning is not supported by scanning system 100, epi-illumination system 126 may be omitted. Fluorescence scanning is the scanning of samples 116 that include fluorescence molecules, which are photon-sensitive molecules that can absorb light at a specific wavelength (i.e., excitation). These photon-sensitive molecules also emit light at a higher wavelength (i.e., emission). Because the efficiency of this photoluminescence phenomenon is very low, the amount of emitted light is often very low. This low amount of emitted light typically frustrates conventional techniques for scanning and digitizing sample 116 (e.g., transmission-mode microscopy).

Advantageously, in an embodiment of scanning system 100 that utilizes fluorescence scanning, use of a line-scan camera 130 that includes multiple linear sensor arrays (e.g., a time-delay-integration (TDI) line-scan camera) increases the sensitivity to light of line-scan camera 130 by exposing the same area of sample 116 to each of the plurality of linear sensor arrays of line-scan camera 130. This is particularly useful when scanning faint fluorescence samples with low levels of emitted light. Accordingly, in a fluorescence-scanning embodiment, line-scan camera 130 is preferably a monochrome TDI line-scan camera. Monochrome images are ideal in fluorescence microscopy because they provide a more accurate representation of the actual signals from the various channels present on sample 116. As will be understood by those skilled in the art, a fluorescence sample can be labeled with multiple florescence dyes that emit light at different wavelengths, which are also referred to as "channels."

Furthermore, because the low-end and high-end signal levels of various fluorescence samples present a wide spectrum of wavelengths for line-scan camera 130 to sense, it is desirable for the low-end and high-end signal levels that line-scan camera 130 can sense to be similarly wide. Accordingly, in a fluorescence-scanning embodiment, line-scan camera 130 may comprise a monochrome 10-bit 64-linear-array TDI line-scan camera. It should be noted that a variety of bit depths for line-scan camera 130 can be employed for use with such an embodiment.

Movable stage 112 is configured for precise X-Y movement under control of processor 104 or motion controller 108. Movable stage 112 may also be configured for Z movement under control of processor 104 or motion controller 108. Movable stage 112 is configured to position sample 116 in a desired location during image data capture by line-scan camera 130 and/or area-scan camera 132. Movable stage 112 is also configured to accelerate sample 116 in a scanning direction to a substantially constant velocity, and then maintain the substantially constant velocity during image data capture by line-scan camera 130. In an embodiment, scanning system 100 may employ a high-precision and tightly coordinated X-Y grid to aid in the location of sample 116 on movable stage 112. In an embodiment, movable stage 112 is a linear-motor-based X-Y stage with high-precision encoders employed on both the X and the Y axes. For example, very precise nanometer encoders can be used on the axis in the scanning direction and on the axis that is in the direction perpendicular to the scanning direction and on the same plane as the scanning direction. Stage 112 is also configured to support glass slide 114 upon which sample 116 is disposed.

Sample 116 can be anything that may be interrogated by optical microscopy. For example, glass microscope slide 114 is frequently used as a viewing substrate for specimens that include tissues and cells, chromosomes, deoxyribonucleic acid (DNA), protein, blood, bone marrow, urine, bacteria, beads, biopsy materials, or any other type of biological material or substance that is either dead or alive, stained or unstained, labeled or unlabeled. Sample 116 may also be an array of any type of DNA or DNA-related material, such as complementary DNA (cDNA) or ribonucleic acid (RNA), or protein that is deposited on any type of slide or other substrate, including any and all samples commonly known as microarrays. Sample 116 may be a microtiter plate (e.g., a 96-well plate). Other examples of sample 116 include integrated circuit boards, electrophoresis records, petri dishes, film, semiconductor materials, forensic materials, and machined parts.

Objective lens 120 is mounted on objective positioner 124, which, in an embodiment, employs a very precise linear motor to move objective lens 120 along the optical axis defined by objective lens 120. For example, the linear motor of objective lens positioner 124 may include a fifty-nanometer encoder. The relative positions of stage 112 and objective lens 120 in X, Y, and/or Z axes are coordinated and controlled in a closed-loop manner using motion controller 108 under the control of processor 104 that employs memory 106 for storing information and instructions, including the computer-executable programmed steps for overall operation of scanning system 100.

In an embodiment, objective lens 120 is a plan apochromatic ("APO") infinity-corrected objective lens which is suitable for transmission-mode illumination microscopy, reflection-mode illumination microscopy, and/or epi-illumination-mode fluorescence microscopy (e.g., an Olympus 40×, 0.75NA or 20×, 0.75 NA). Advantageously, objective lens 120 is capable of correcting for chromatic and spherical aberrations. Because objective lens 120 is infinity-corrected, focusing optics 128 can be placed in optical path 122 above objective lens 120 where the light beam passing through objective lens 120 becomes a collimated light beam. Focusing optics 128 focus the optical signal captured by objective lens 120 onto the light-responsive elements of line-scan camera 130 and/or area-scan camera 132, and may include optical components such as filters, magnification changer lenses, and/or the like. Objective lens 120, combined with focusing optics 128, provides the total magnification for scanning system 100. In an embodiment, focusing optics 128 may contain a tube lens and an optional 2× magnification changer. Advantageously, the 2× magnification changer allows a native 20X objective lens 120 to scan sample 116 at 40× magnification.

Line-scan camera 130 comprises at least one linear array of picture elements 142 ("pixels"). Line-scan camera 130 may be monochrome or color. Color line-scan cameras typically have at least three linear arrays, while monochrome line-scan cameras may have a single linear array or plural linear arrays. Any type of singular or plural linear array, whether packaged as part of a camera or custom-integrated into an imaging electronic module, can also be used. For example, a three linear array ("red-green-blue" or "RGB") color line-scan camera or a ninety-six linear array monochrome TDI may also be used. TDI line-scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line-scan cameras comprise multiple linear arrays. For example, TDI line-scan cameras are available with 24, 32, 48, 64, 96, or even more linear arrays. Scanning system 100 also supports linear arrays that are manufactured in a variety of formats including some with 512 pixels, some with 1,024 pixels, and others having as many as 4,096 pixels. Similarly, linear arrays with a variety of pixel sizes can also be used in scanning system 100. The salient requirement for the selection of any type of line-scan camera 130 is that the motion of stage 112 can be synchronized with the line rate of line-scan camera 130, so that stage 112 can be in motion with respect to line-scan camera 130 during the digital image capture of sample 116.

In an embodiment, the image data generated by line-scan camera 130 is stored in a portion of memory 106 and processed by processor 104 to generate a contiguous digital image of at least a portion of sample 116. The contiguous digital image can be further processed by processor 104, and the processed contiguous digital image can also be stored in memory 106.

In an embodiment with two or more line-scan cameras 130, at least one of the line-scan cameras 130 can be configured to function as a focusing sensor that operates in combination with at least one of the other line-scan cameras 130 that is configured to function as an imaging sensor. The focusing sensor can be logically positioned on the same optical axis as the imaging sensor or the focusing sensor may be logically positioned before or after the imaging sensor with respect to the scanning direction of scanning system 100. In such an embodiment with at least one line-scan camera 130 functioning as a focusing sensor, the image data generated by the focusing sensor may be stored in a portion of memory 106 and processed by processor 104 to generate focus information, to allow scanning system 100 to adjust the relative distance between sample 116 and objective lens 120 to maintain focus on sample 116 during scanning. Additionally, in an embodiment, the at least one line-scan camera 130 functioning as a focusing sensor may be oriented such that each of a plurality of individual pixels 142 of the focusing sensor is positioned at a different logical height along the optical path 122.

In operation, the various components of scanning system 100 and the programmed modules stored in memory 106 enable automatic scanning and digitizing of sample 116, which is disposed on glass slide 114. Glass slide 114 is securely placed on movable stage 112 of scanning system 100 for scanning sample 116. Under control of processor 104, movable stage 112 accelerates sample 116 to a substantially constant velocity for sensing by line-scan camera 130, where the speed of stage 112 is synchronized with the line rate of line-scan camera 130. After scanning a stripe of image data, movable stage 112 decelerates and brings sample 116 to a substantially complete stop. Movable stage 112 then moves orthogonal to the scanning direction to position sample 116 for scanning of a subsequent stripe of image data (e.g., an adjacent stripe). Additional stripes are subsequently scanned until an entire portion of sample 116 or the entire sample 116 is scanned.

For example, during digital scanning of sample 116, a contiguous digital image of sample 116 is acquired as a plurality of contiguous fields of view that are combined together to form an image stripe. A plurality of adjacent image stripes are similarly combined together to form a contiguous digital image of a portion or the entire sample 116. The scanning of sample 116 may include acquiring vertical image stripes or horizontal image stripes. The scanning of sample 116 may be either top-to-bottom, bottom-to-top, or both (i.e., bi-directional), and may start at any point on sample 116. Alternatively, the scanning of sample 116 may be either left-to-right, right-to-left, or both (i.e., bi-directional), and may start at any point on sample 116. It is not necessary that image stripes be acquired in an adjacent or contiguous manner. Furthermore, the resulting image of sample 116 may be an image of the entire sample 116 or only a portion of the sample 116.

In an embodiment, computer-executable instructions (e.g., programmed modules and software) are stored in memory 106 and, when executed, enable scanning system 100 to perform the various functions (e.g., display the graphical user interface, execute the disclosed processes, control the components of scanning system 100, etc.) described herein. In this description, the term "computer-readable storage medium" is used to refer to any media used to store and provide computer-executable instructions to scanning system 100 for execution by processor 104. Examples of these media include memory 106 and any removable or external storage medium (not shown) communicatively coupled with scanning system 100 either directly (e.g., via a universal serial bus (USB), a wireless communication protocol, etc.) or indirectly (e.g., via a wired and/or wireless network).

Figure 1B:
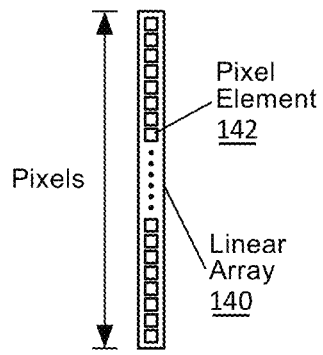
FIG. 1B illustrates an example line-scan camera having a single linear array, according to an embodiment.

FIG. 1B illustrates a line-scan camera 130 having a single linear array 140, which may be implemented as a charge-coupled device ("CCD") array. Single linear array 140 comprises a plurality of individual pixels 142. In the illustrated embodiment, the single linear array 140 has 4.0% pixels 142. In alternative embodiments, linear array 140 may have more or fewer pixels. For example, common formats of linear arrays include 512, 1.024, and 4,096 pixels. Pixels 142 are arranged in a linear fashion to define a field of view 134 for linear array 140. The size of field of view 134 varies in accordance with the magnification of scanning system 100.

Figure 1C:
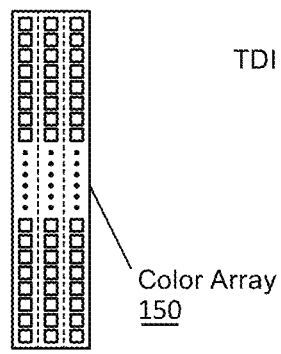
FIG. 1C illustrates an example line-scan camera having three linear arrays, according to an embodiment.

FIG. 1C illustrates a line-scan camera 130 having three linear arrays 140, each of which may be implemented as a CCD array. The three linear arrays 140 combine to form a color array 150. In an embodiment, each individual linear array in color array 150 detects a different color intensity, including, for example, red, green, or blue. The color image data from each individual linear array 140 in color array 150 is combined to form a single field of view 134 of color image data.

Figure 1D:
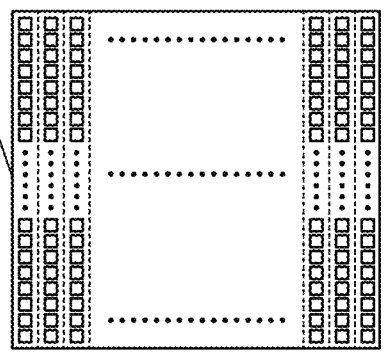
FIG. 1D illustrates an example line-scan camera having a plurality of linear arrays, according to an embodiment.

FIG. 1D illustrates a line-scan camera 130 having a plurality of linear arrays 140, each of which may be implemented as a CCD array. The plurality of linear arrays 140 combine to form a TDI array 160. Advantageously, a TDI line-scan camera may provide a substantially better SNR in its output signal by summing intensity data from previously imaged regions of a specimen, yielding an increase in the SNR that is in proportion to the square-root of the number of linear arrays 140 (also referred to as integration stages). A TDI line-scan camera may comprise a larger variety of numbers of linear arrays 140. For example, common formats of TDI line-scan cameras include 24, 32, 48, 64, 96, 120, and even more linear arrays 140.

2. Physical Calibration Slide

The disclosed physical calibration slide may be used for setting up, aligning, and calibrating scanning systems 100, such as the bright-field slide scanners produced by Leica Biosystems® of Nussloch, Germany. In an embodiment, the physical calibration slide may be a glass slide (e.g., like glass slide 114) with physical dimensions of 25 millimeters (mm)×75 mm×1 mm. However, it should be understood that other sizes are possible.

The physical calibration slide may comprise a plurality of features, with each feature being targeted towards one or more calibration operations. A scanning system 100 may automatically or with manual intervention scan one or more of the plurality of features on the physical calibration slide. Scanning system 100 may then use the image of each scanned feature to perform calibration operations (e.g., by processor 104), such as calculating calibration parameters, aligning cameras 130 and/or 132, and/or the like. Any calculated calibration parameters may be stored in a configuration file (e.g., in memory 106) on scanning system 100, to be loaded and reused during each initialization of scanning system 100.

2.1. Overview

Figure 2A:
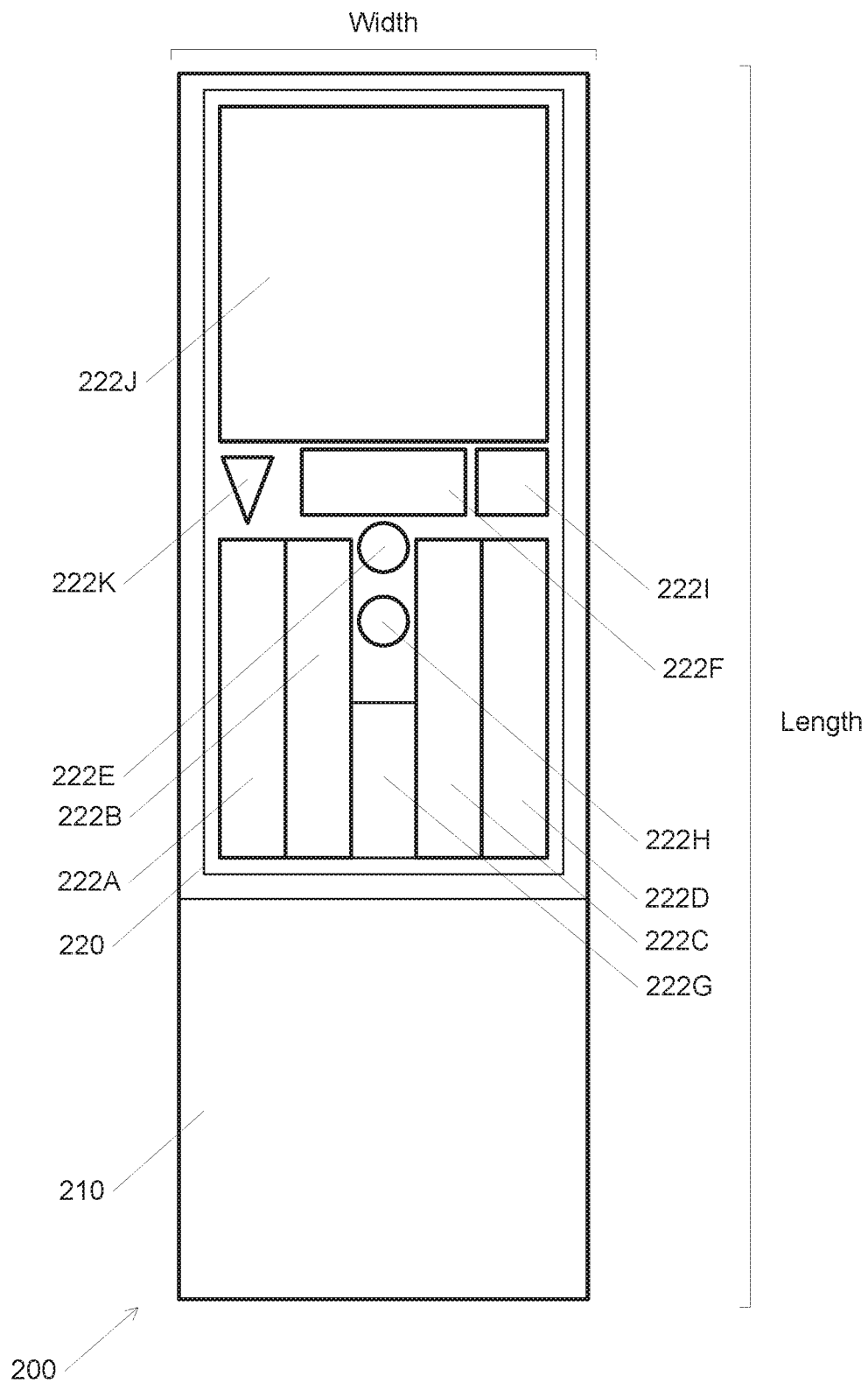
FIGS. 2A and 2B illustrate a physical calibration slide, according to embodiments.

FIG. 2A illustrates a physical calibration slide 200, according to an embodiment. In the illustrated embodiment, physical calibration slide 200 has a width (i.e., along the short axis) of 25 mm and a length (i.e., along the long axis) of 75 mm. It should be understood that, in the illustrated embodiments, the short and long axes of physical calibration slide 200 correspond to the X and Y axes of scanning system 100, respectively. However, in an alternative embodiment, the short and long axes of physical calibration slide 200 could correspond to the Y and X axes, respectively. Physical calibration slide 200 may comprise a label area 210 and a feature box 220.

Label area 210 may comprise text and/or images that identify the purpose of physical calibration slide 200 (e.g., "setup-calibration slide"), a model of physical calibration slide 200 (e.g., model number, revision number, etc.), a manufacturer of physical calibration slide 200 or scanning systems 100 with which physical calibration slide 200 is intended to be used, and/or the like. Label area 210 may correspond in size and position to the label area (e.g., comprising a barcode) of a typical glass slide 114 used for digital pathology.

Feature box 220 may be distinguished by a line that defines the boundary or scaling factor of the coordinate system to be used for calibration. In an embodiment, feature box 220 may be 48 mm×22 mm and be delineated by a 50 micrometer (μm) thick, clear boundary line (e.g., chrome-etched). Feature box 220 comprises a plurality of features 222. Each feature 222 is targeted towards one or more calibration operations to be performed by a scanning system 100. One or more—including potentially all of—features 222 may comprise a pattern created by chrome etching. For example, chromium may be deposited on the glass substrate of physical calibration slide 200, and the patterns representing features 222 may be etched into the deposited chromium using any well-known method. In alternative embodiments, techniques, other than chrome-etching, may be used for creating the patterns representing features. Such techniques include, without limitation, laser writing, E-beam writing, and/or the like. However, while such techniques may provide more precision, they are generally more expensive.

Figure 2B:
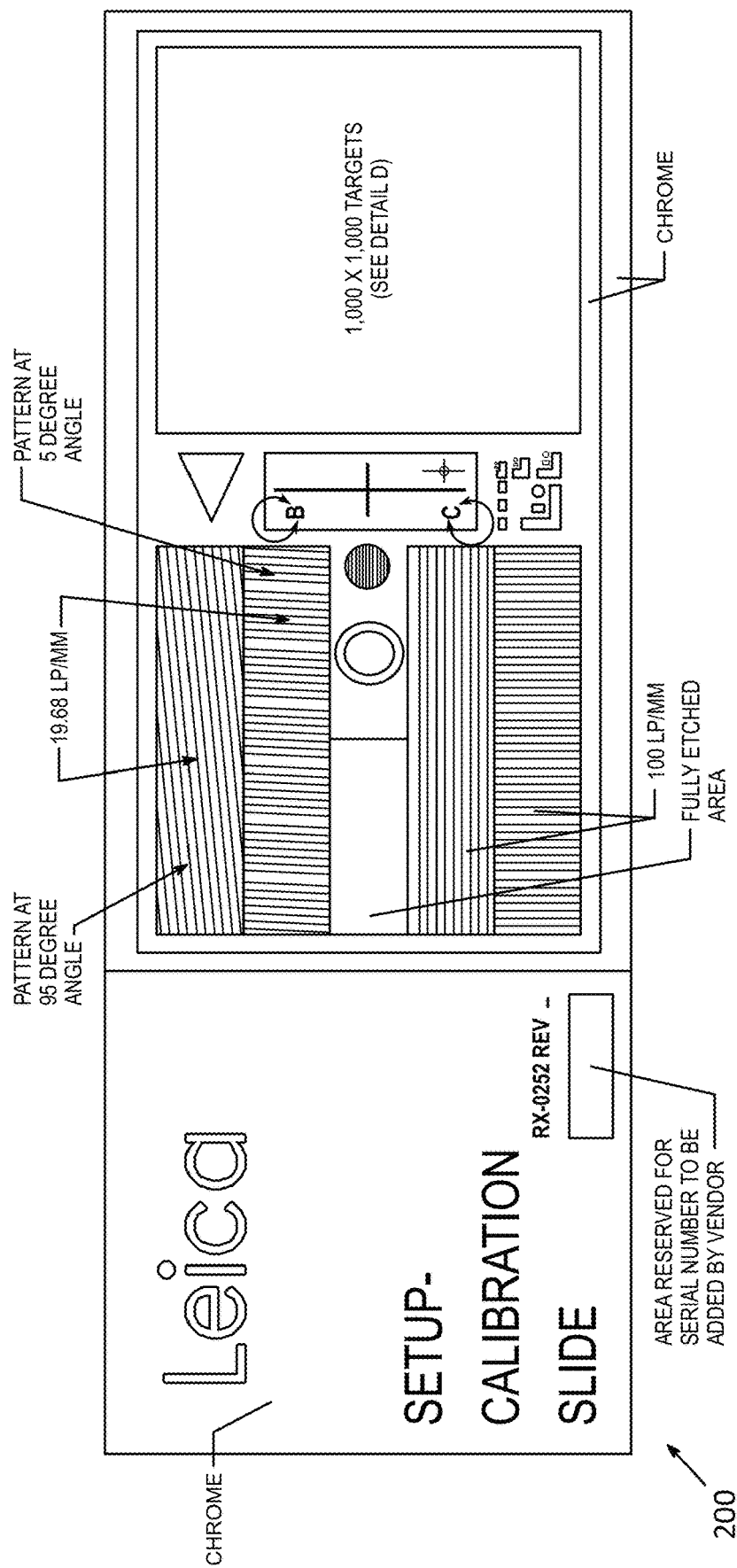

FIG. 2B illustrates a specific example of physical calibration slide 200, according to an embodiment. While a specific selection and arrangement of features 222 are illustrated in FIG. 2B, different selections and/or arrangements of features 222 may also be used. One or more of features 222 may be designed for scanning along both axes (i.e., short and long axes) of physical calibration slide 200. One notable exception may be the Ronchi rulings features (slanted and/or straight) which may be oriented to favor the scanning axis (e.g., which may correspond to either the long or short axis of physical calibration slide 200).

The various lines etched on physical calibration slide 200 (e.g., to form feature box 220, the patterns of features 222, etc.) may all generally be of uniform thickness, unless otherwise specified. In a preferred embodiment, the lines are all generally 50 μm thick. In an alternative embodiment, the lines may all generally be 100 μm thick. However, different line thicknesses may also be used, including different thicknesses for different lines, depending on the particular design and cost goals.

In an embodiment, no coverslip is used for physical calibration slide 200. A coverslip could introduce imaging variation across physical calibration slide 200 due to non-uniform gluing and air bubbles and/or glue cracks from aging. Such variation would impact some of the tests of scanning system 100. However, a coverslip may be added for modulation transfer function (MTF) tests if the scanner is optimized for scanning cover-slipped samples.

2.2. Slanted Ronchi Rulings

Figure 3:
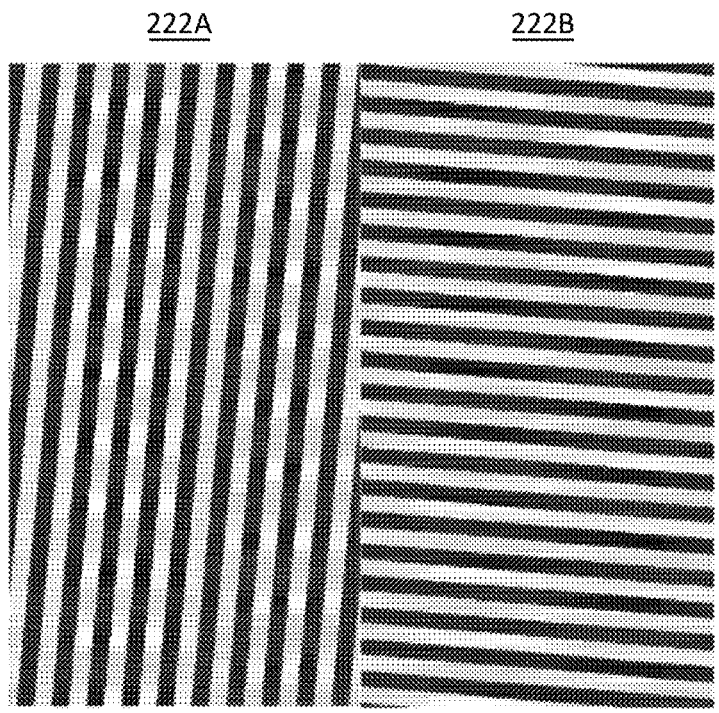
FIG. 3 illustrates a slanted Ronchi rulings feature, according to an embodiment.

In an embodiment, physical calibration slide 200 comprises slanted Ronchi rulings features 222A and 222B. Slanted Ronchi rulings features 222A and 222B may be used by scanning system 100 to perform MTF tests and/or analyze the analytical model for scanning system 100. FIG. 3 illustrates a close up of a portion of slanted Ronchi rulings features 222A and 222B, according to an embodiment. As illustrated, slanted Ronchi rulings feature 222A comprises parallel Ronchi rulings slanted at 95° with respect to the short axis of physical calibration slide 200, whereas slanted Ronchi rulings feature 222B comprises parallel Ronchi rulings slanted at 5° with respect to the short axis. In an embodiment, the resolution of slanted Ronchi rulings features 222A and/or 222B may be 19.68 line pairs per millimeter (LP/mm) or 500 LP/inch. Each of slanted Ronchi rulings features 222A and 222B may be 4 mm×20 mm with the longer dimension parallel to the long axis of physical calibration slide 200.

2.3. Straight Ronchi Rulings

In an embodiment, physical calibration slide 200 comprises straight Ronchi rulings features 222C and 222D. Straight Ronchi rulings features 222C and 222D may be used by scanning system 100 alignment, motion tests, chromatic aberration tests, focus checks, vibration tests, left and right focus tests, and/or a macro focus (MF) limits setup. One straight Ronchi rulings feature 222C may comprise parallel lines that extend parallel to the long axis of physical calibration slide 200, whereas the other straight Ronchi rulings feature 222D may comprise parallel lines that extend parallel to the short axis of physical calibration slide 200. In other words, the separate straight Ronchi rulings features 222C and 222D may be orthogonal to each other. The resolution of straight Ronchi rulings features 222C and/or 222D may be 100 LP/mm. Each of straight Ronchi rulings features 222C and 222D may be 4 mm×20 mm with the longer dimension parallel to the long axis of physical calibration slide 200.

Figure 4A:
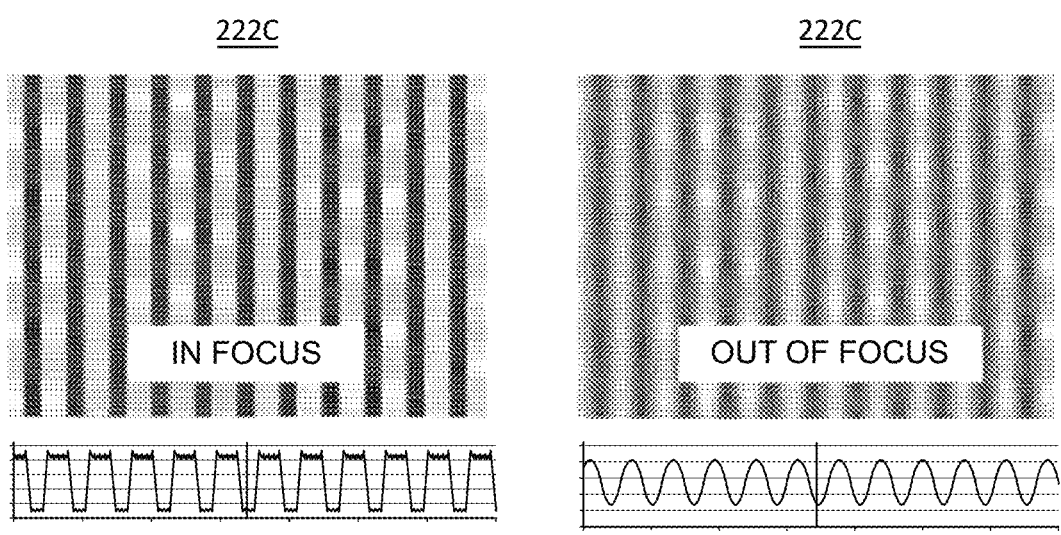
FIG. 4A illustrates a straight Ronchi rulings feature, according to an embodiment.

As mentioned above, straight Ronchi rulings features 222C and 222D may be used for checking focus. For instance, FIG. 4A illustrates the same straight Ronchi rulings feature 222C both in focus and out of focus, from left to right.

Figure 4B:
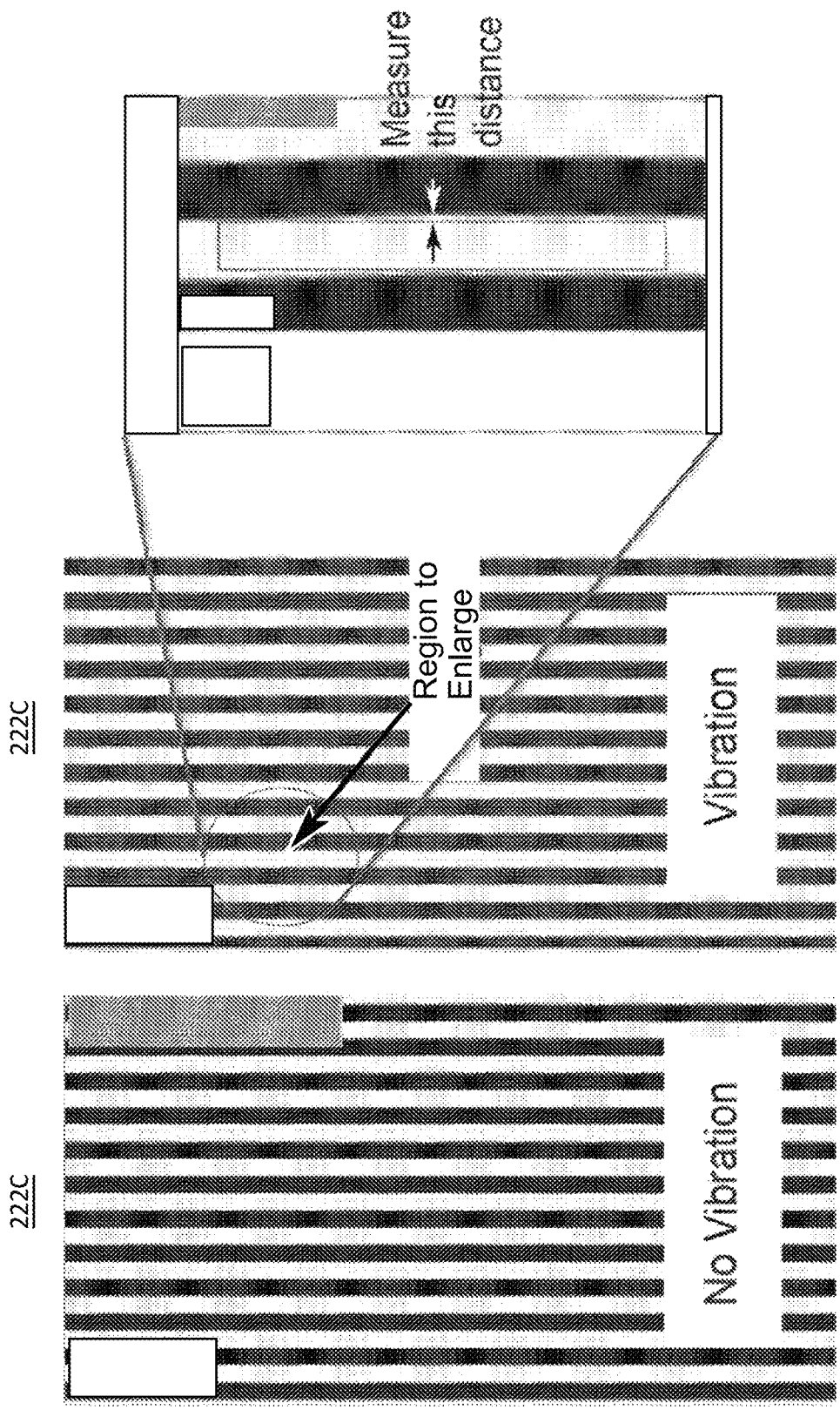

As mentioned above, straight Ronchi rulings features 222C and 222D may be used for vibration testing (e.g., measurement). For instance, FIG. 4B illustrates the same straight Ronchi rulings feature 222C both with no vibration and vibration, from left to right. As illustrated, the variable distance between adjacent parallel Ronchi lines can be used to measure the effect of vibrations in scanning system 100. For example, the effect may be represented as an error that is calculated based on the difference in distance between adjacent parallel Ronchi lines in a scanned image of physical calibration slide and the actual, known distance between those adjacent parallel Ronchi lines on physical calibration slide 200.

As mentioned above, straight Ronchi rulings features 222C and 222D may be used for chromatic aberration tests. For instance, FIG. 4C illustrates a lateral chromatic test using straight Ronchi rulings feature 222C.

As mentioned above, straight Ronchi rulings features 222C and 222D may be used for motion tests. For instance, FIG. 4D illustrates a scan velocity test and trilinear sensor spacing test using straight Ronchi rulings feature 222D. The left side illustrates an image of straight Ronchi rulings feature 222D acquired using the correct scan speed, whereas the right side illustrates an image of the same straight Ronchi rulings feature 222D acquired using the wrong scan speed. To achieve the correct image aspect ratio, the scan velocity of scanning system 100 (e.g., the velocity of stage 112) should be synchronized with the line rate of line scan camera 130. The color shift can be corrected by adjusting the line spatial correction parameter in line scan camera 130, but the image aspect ratio will be incorrect.

Figure 4E:
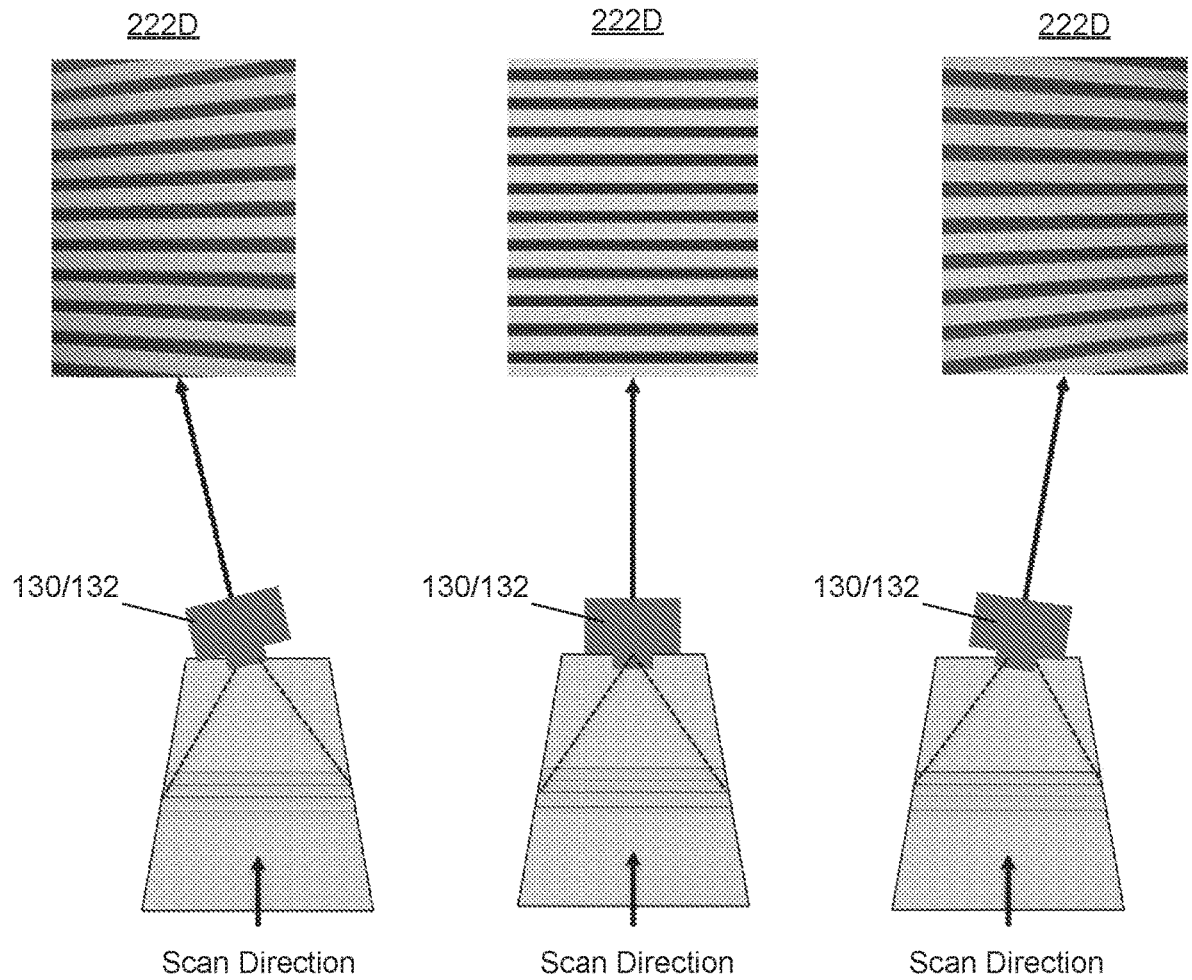

As mentioned above, straight Ronchi rulings features 222C and 222D may be used for alignment. For instance, FIG. 4E illustrates the detection of camera rotation on the short axis of line scan camera 130 using straight Ronchi rulings feature 222D. The left side shows rotation in one direction, the right side shows rotation in the opposite direction, and the middle shows alignment (i.e., no rotation).

2.4. Star Target

In an embodiment, physical calibration slide 200 comprises star target feature 222E. Star target feature 222E may be used as an alignment mark and as a target for focusing tests by scanning system 100. For instance, FIG. 5A illustrates a close up of star target feature 222E, according to an embodiment. As illustrated, star target feature 222E comprises a circle 510 with thirty-six (36) wedge pairs, i.e., seventy-two (72) total wedges. Each wedge pair comprises both a fully etched wedge 520A and a chrome wedge 520B, with each wedge representing 5° of the circle 510. In addition, circle 510 may comprise a core 530. In an embodiment, the outer diameter of the circle 510 is 2 mm, and the core 530 of the circle 510 is fully etched with a diameter of 0.030 mm. It should be understood that different numbers and sizes of wedges 520 and/or different sizes of core 540 (e.g., 0.001 mm diameter) may be used, depending on the manufacturable resolution.

As illustrated in FIG. 5A, star target feature 222E may comprise one or more etched inner circles 540 between the core 530 and the circumference of the circle 510. For example, at least one inner circle 540 may have a line thickness of 50 µm with an inner diameter of 0.637 mm, for an equivalent 18 LP/mm macro image resolution. During macro focus alignment, star target feature 222E should be resolvable outside this inner circle 540. Thus, this inner circle 540 can be used for pass/fail testing on macro imaging.

FIG. 5B is a close up of the core 530 of star target feature 222E, according to an embodiment. In an embodiment, the core 530 of star target feature 222E may comprise a dot 550 (e.g., chrome) in the center of star target feature 222E. For example, dot 550 may have a 1.3 µm diameter. The core 530 and/or dot 550 may be used for fine alignment, positioning, and/or registration (e.g., macro corner index alignment).

2.5. Crosshair

Figure 6:
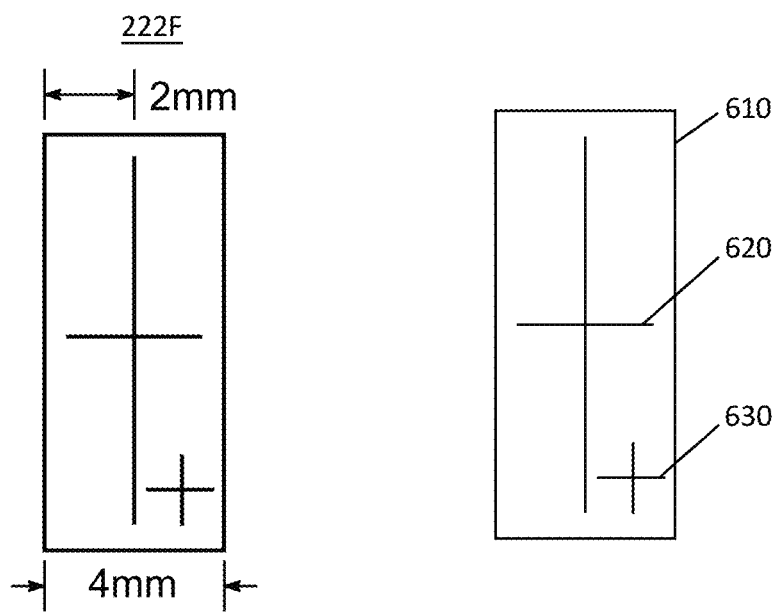
FIG. 6 illustrates a crosshair feature, according to an embodiment.

In an embodiment, physical calibration slide 200 comprises crosshair feature 222F. For instance, FIG. 6 illustrates a close up of crosshair feature 222F, according to an embodiment. As illustrated, crosshair feature 222F may comprise an outer rectangle 610 surrounding a centered crosshair 20 that almost fills the outer rectangle 610. In addition, a smaller, offset crosshair 630 may be positioned in one corner (e.g., right-lower corner) within the outer rectangle 610. Each crosshair 620 and 630 may comprise two orthogonal, bisecting lines. The lines of the outer rectangle 610 and/or centered crosshair 620 may be 50 µm thick, whereas the lines of the offset crosshair 630 may be 10 µm thick (e.g., corresponding to approximately 38 pixels with 0.26 µm/pixel resolution). The centered crosshair 620 may be 3 mm×9 mm, whereas the offset crosshair 630 may be 1.5 mm×2 mm. In an embodiment, the outer rectangle 610 is 4 mm wide (i.e., along the short axis).

The centered crosshair 620 in crosshair feature 222F may define the center of the coordinate system in macro imaging, and, for example, be located at the precise center of feature box 220. The offset crosshair 630 may be used for fine alignment between high-resolution cameras (e.g., imaging sensor of line-scan camera 130 and/or focusing camera 132).

2.6. Clear Area

In an embodiment, physical calibration slide 200 comprises clear area feature 222G. Clear area feature 222G comprises a blank or clear area (e.g., fully etched) that may be used for illumination correction. As illustrated, a region between slanted Ronchi rulings feature 222B and straight Ronchi rulings feature 222C may be used as the clear area of feature 222G. As an example, clear area feature 222G may be 4 mm×10 mm with the longer dimension parallel to the long axis of physical calibration slide 200.

2.7. Letter O

Figure 7:
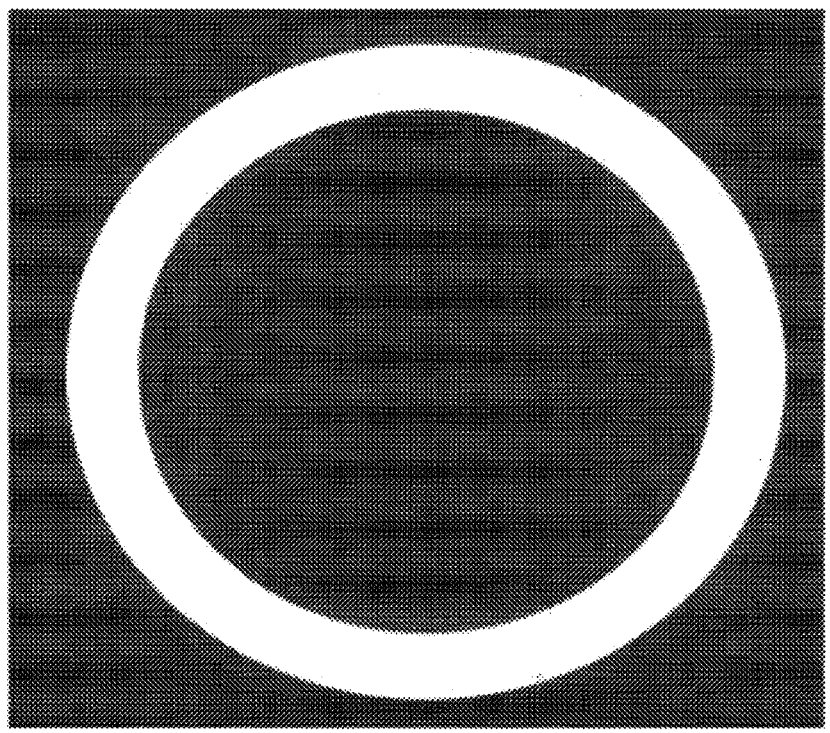
FIG. 7 illustrates a letter-O feature, according to an embodiment.

In an embodiment, physical calibration slide 200 comprises letter-O feature 222H. Letter-O feature 222H comprises a letter "O" for macro imaging. FIG. 7 illustrates this letter "O", according to an embodiment. Letter-O feature 222H may be rotationally symmetric and independent of the scan axis. The line thickness of the letter "O" may be 300 μm or greater (e.g., 350 μm), approximating 20 pixels for easy identification, and the diameter of the letter "O" may be 3 mm. The letter "O" may be formed by chrome etching, so that the line of the letter "O" remains in chromium. Advantageously, the edges of the letter "O" can be used to judge macro focusing.

2.8. Resolution Targets

In an embodiment, physical calibration slide 200 comprises a resolution target feature 222I. Resolution target feature 222I may comprise one or more resolution targets for macro and/or micro imaging. In the embodiment illustrated in FIG. 8, resolution target feature 222I comprises seven (7) resolution targets that conform to the 1010A standard of the National Institute of Standards and Technology (NIST) and National Bureau of Standards (NBS). These resolution targets may include an 8.0 cycles/mm target (e.g., with line width of 62.5 μm) as a location mark, 14.0, 16.0, and 18.0 cycles/mm targets for macro imaging (e.g., with each line width representing approximately 2 pixels), a 101.2 cycles/mm target for 4× imaging, a 255.2 cycles/mm target for 10× imaging (e.g., for best effort), and a 510.0 cycles/mm (or 500.0 or 510.2 cycles/mm) target for 20× imaging (e.g., with line width of 1 μm).

Figure 8:
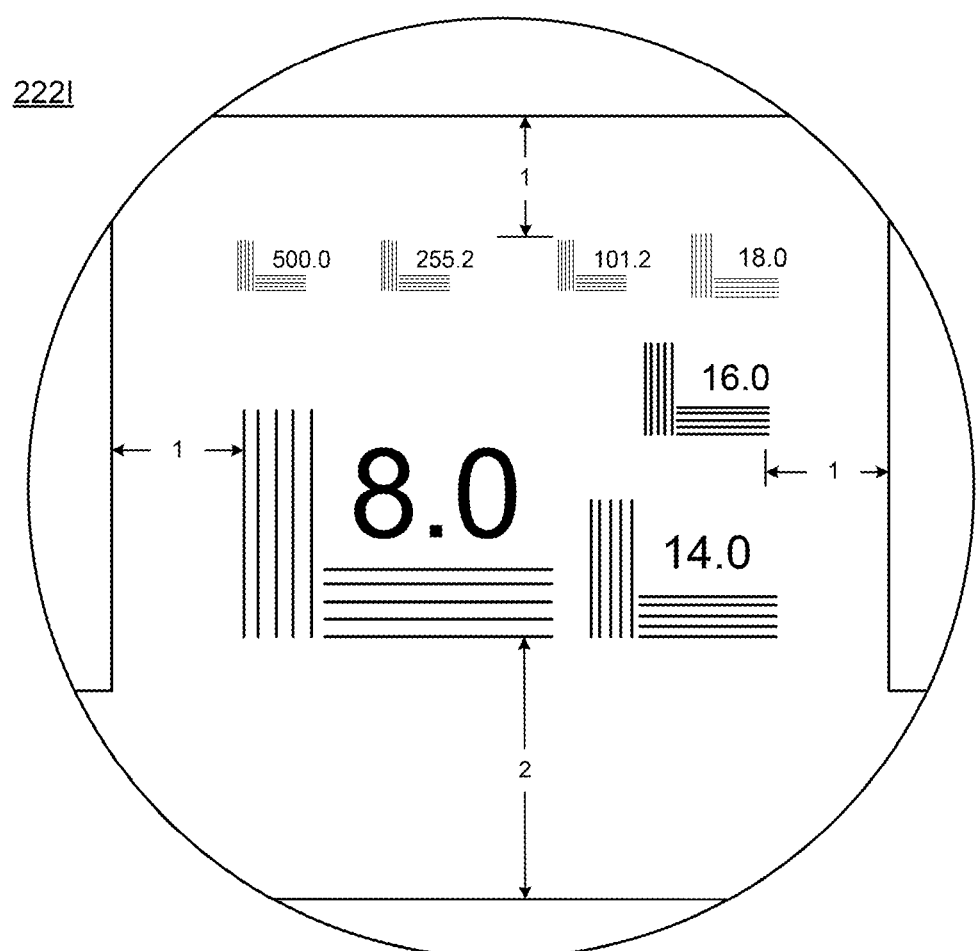
FIG. 8 illustrates a resolution target feature, according to an embodiment.

In an embodiment, one or more of the resolution targets in resolution target feature 222I may be encircled for easier identification on a magnified image. For example, a circle may be etched around both the 510.0 cycle/mm and 255.2 cycles/mm resolution targets, as illustrated in FIG. 8.

2.9. Bullseyes

Figure 9A:
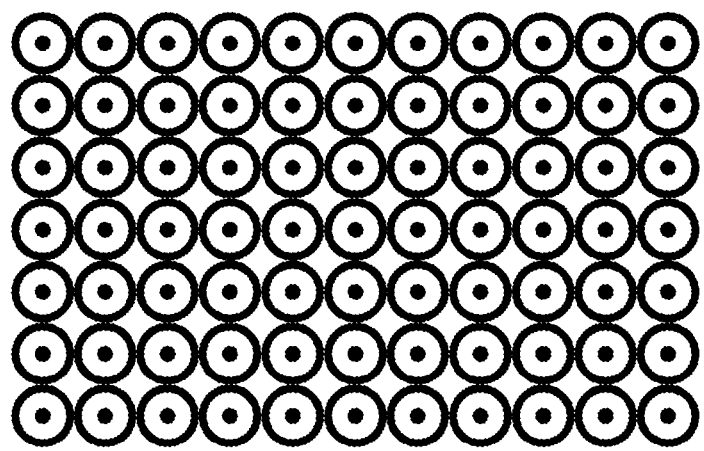
FIG. 9A illustrates a bullseye feature, according to an embodiment.

In an embodiment, physical calibration slide 200 comprises a bullseye feature 222J. Bullseye feature 222J may be used for distortion tests, stitching error tests, camera walk-off tests, area camera rotation tests, and/or stripe alignment tests. Bullseye feature 222J may comprise a sea of bullseyes (i.e., a two-dimensional array of bullseyes). The sea may be a 1,000×1,000 square of tightly packed bullseyes (i.e., one million bullseyes). However, other dimensions are possible, depending on the design and cost constraints. FIG. 9A illustrates a 7×11 portion of the sea of bullseyes, according to an embodiment. Each bullseye may comprise a 5 μm dot in the center of a 20 μm circle, and the entire sea of bullseyes in bullseye feature 222J may be a 20 mm×20 mm square that is symmetric along both axes (i.e., along both the short and long axes of physical calibration slide 200).

As mentioned above, bullseye feature 222J may be used for distortion testing. FIG. 9B illustrates examples of one-dimensional and two-dimensional distortion using a sea of bullseyes.

As mentioned above, bullseye feature 222J may be used for stitching error tests. FIG. 9C illustrates examples of up-and-down stitching error and left-and-right stitching error using a portion of the sea of bullseyes.

Figure 9D:
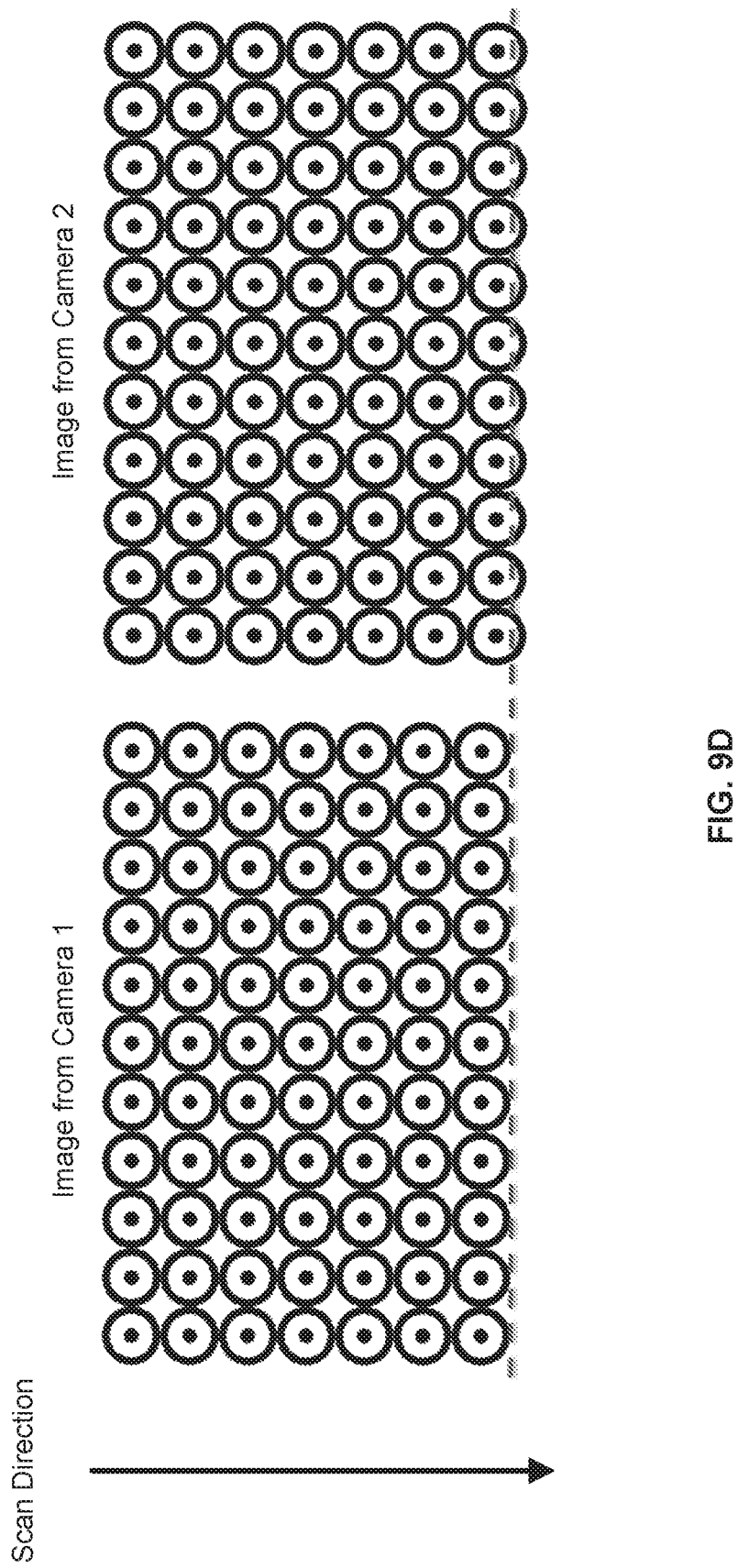

As mentioned above, bullseye feature 222J may be used for a camera walk-off test (e.g., to test unsynchronized cameras in the case that scanning system 100 comprises a plurality of cameras 130 and/or 132). FIG. 9D illustrates an example of a camera walk-off test using a sea of bullseyes.

Figure 9E:
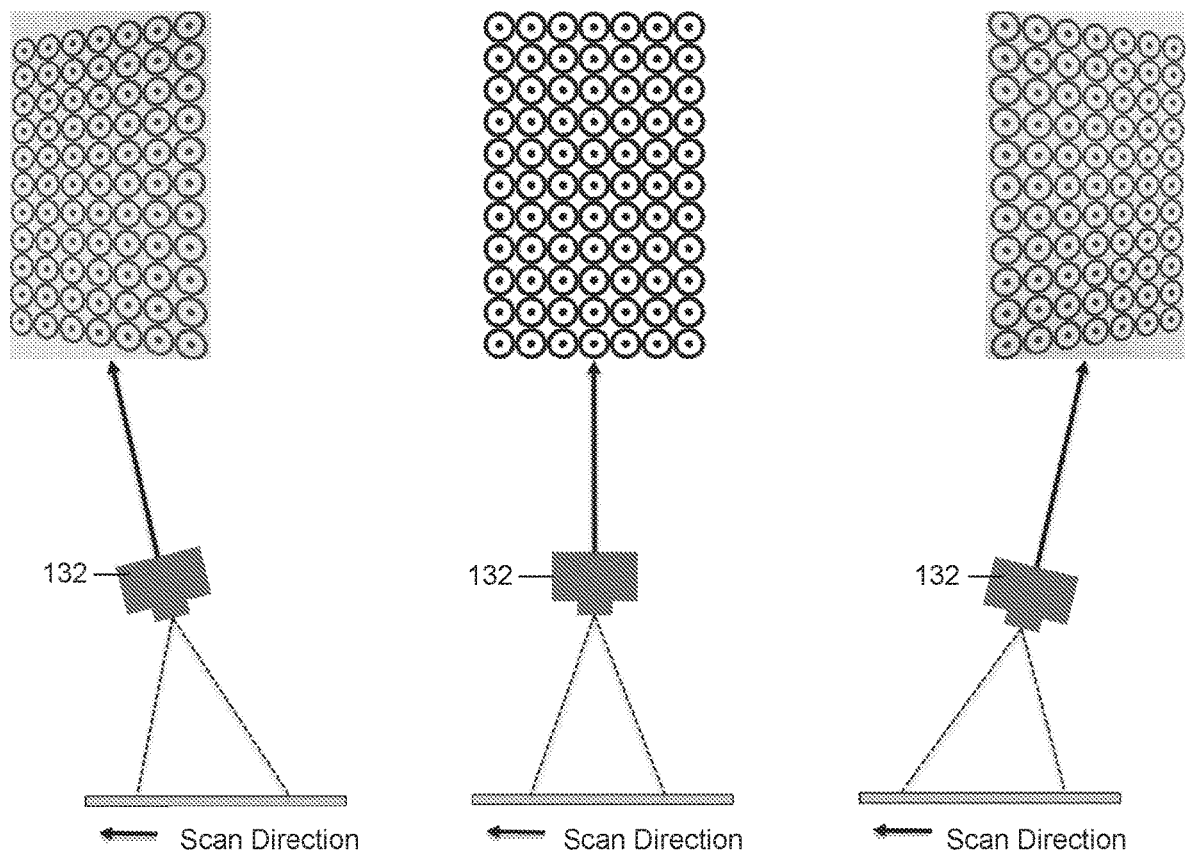

As mentioned above, bullseye feature 222J may be used to detect rotation of area scan camera 132. FIG. 9E illustrates an example of an area camera rotation test. The left side shows rotation in one direction, the right side shows rotation in the opposite direction, and the middle shows alignment (i.e., no rotation).

2.10. Triangle

Figure 10:
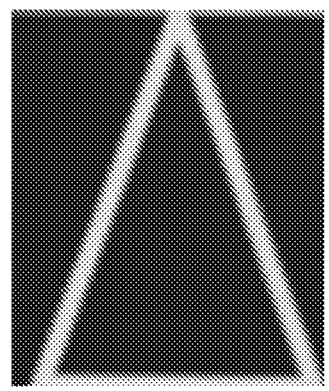
FIG. 10 illustrates a triangle feature, according to an embodiment.

In an embodiment, physical calibration slide 200 comprises at least one triangle feature 222K. Triangle feature 222K may be used to match fields of view (FOV) between two cameras 130 (e.g., a main imaging and focusing sensor) and/or 132, and/or macro image focusing. As illustrated in FIG. 10, according to an embodiment, triangle feature 222K may comprise a 45° isosceles triangle. As an example, the triangle may have a base that is 3 mm wide, a height of 3.6 mm, and be formed by lines that are 50 μm thick (e.g., resolved with 4 pixels at 13 μm/pixel macro image resolution). In an embodiment, there may be two triangle features 222K, that are oriented 90° with respect to each other (e.g., on opposite sides of feature 222F along the short axis of physical calibration slide 200).

2.11. Symmetric Corners

In an embodiment, physical calibration slide 200 comprises one or more sets of symmetric corner features 222, such as arrays of dots and/or squares arranged in an "L" pattern, that are symmetric along both the short and long axes of physical calibration slide 200. Each corner feature 222 may be used for increased sensitivity in rigid-body (e.g., lateral and/or rotational) alignment, i.e., fine alignment.

Figure 11:
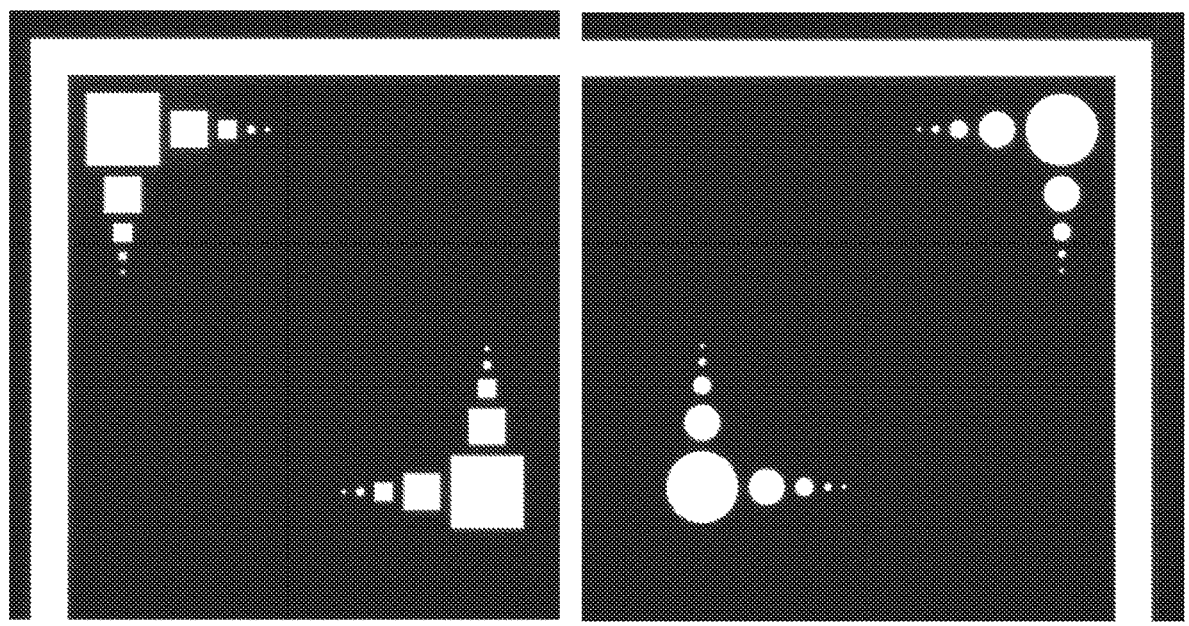
FIG. 11 illustrates examples of a symmetric corner feature, according to embodiments.

FIG. 11 illustrates two examples of corner feature 222. Physical calibration slide 200 may comprise one, both, or none of these examples. In both examples, corner feature 222 comprises two sets of fully etched geometric shapes in two opposite corners of a box, with the sets of geometric shapes being symmetrical to each other about both diagonals of the box. In each corner, the geometric shapes are arranged with the largest shape in the corner, and additional shapes extending from the corner, with decreasing size, in an "L" pattern. Center-to-center the shapes may be spaced at 0.5 mm from each other and cover a total of 0.7 mm FOV.

In the left-side example, the geometric shapes are squares, with a corner square and two arrays of squares that are spaced apart (e.g., 0.05 mm center-to-center) and extend from the corner square in orthogonal directions. The corner square may have a width of 100 μm, and the squares in both arrays may have widths of 5 μm, 10 μm, 25 μm, and 50 μm, respectively, from farthest from the corner square to closest to the corner square.

In the right-side example, the geometric shapes are dots, with a corner dot and two arrays of dots that are spaced apart (e.g., 0.05 mm center-to-center) and extend from the corner dot in orthogonal directions. The corner dot may have a diameter of 100 μm, and the dots in both arrays may have diameters of 5 μm, 10 μm, 25 μm, and 50 μm, respectively, from farthest from the corner dot to closest to the corner dot. It should be understood that different geometric shapes may be used, other than dots or squares, including different shapes within the same corner feature 222.

In an embodiment, corner feature 222 may be used to check a sensor's perpendicularity for both a color sensor (e.g., main imaging sensor of line scan camera 130) and a second sensor (e.g., focusing sensor of line scan camera 130 and/or area scan camera 132). Specifically, a scanned image of corner feature 222 can demonstrate whether or not the respective sensor is skewed (i.e., not perpendicular).

In an embodiment, corner feature 222 can be used to align two cameras, such as the main imaging sensor and focusing sensor of line scan camera 130 and/or area camera 132. Specifically, images of corner feature 222 from both cameras can be overlaid on each other. If there is blurriness, then the two cameras are not aligned. Lateral shifting and/or rotation of the cameras can then be performed until the two overlaid images align (i.e., are no longer blurry).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B. or C," "one or more of A. B, or C," "at least one of A. B, and C," "one or more of A, B, and C." and "A, B, C, or any combination thereof" include any combination of A, B, and/or C, and may include multiples of A, multiples of B, or multiples of C. Specifically, combinations such as "at least one of A. B, or C," "one or more of A, B, or C," "at least one of A, B, and C," "one or more of A, B, and C," and "A, B, C, or any combination thereof" may be A only, B only, C only, A and B, A and C, B and C, or A and B and C. and any such combination may contain one or more members of its constituents A, B, and/or C. For example, a combination of A and B may comprise one A and multiple B's, multiple A's and one B, or multiple A's and multiple B's.

What is claimed is:

1. A calibration slide, having a long axis along a first side and short axis along a second side, the calibration slide comprising: a plurality of etched features, comprising:
   (a) a first ruling feature comprising a least one set of parallel lines that are slanted with respect to the long axis;
   (b) a second ruling feature positioned adjacent to the first ruling feature, the second ruling feature comprising at least one set of parallel lines that are slanted with respect to the short axis;
   (c) a clear area etched adjacent to the second ruling feature, the clear area being configured for illumination correction;
   (d) a third ruling feature positioned adjacent to the clear area, a portion of the clear area that is adjacent to second and third ruling features also being positioned between the first ruling feature and the third ruling feature, the third ruling feature comprising at least one set of parallel lines that are parallel to the long axis; and
   (e) a fourth ruling feature positioned adjacent to the third ruling feature, the fourth ruling feature comprising at least one set of parallel lines that are parallel to the short axis.

2. The calibration slide of claim 1, further comprising one or more of:
   a star target feature comprising a circle with a plurality of wedge pairs, wherein each of the plurality of wedge pairs comprises an etched wedge and a non-etched wedge;
   a crosshair feature comprising at least one crosshair;
   a letter-O feature comprising a circle;
   a resolution target feature comprising one or more resolution targets;
   a bullseye feature comprising a two-dimensional array of bullseyes;
   a triangle feature comprising at least one isosceles triangle; or
   a symmetric corners feature comprising two symmetric sets of geometric shapes arranged in an L-shape.

3. The physical calibration slide of claim 1, comprising:
   a star target feature comprising a circle with a plurality of wedge pairs, wherein each of the plurality of wedge pairs comprises an etched wedge and a non-etched wedge;
   a crosshair feature comprising at least one crosshair;
   a letter-O feature comprising a circle;
   a resolution target feature comprising one or more resolution targets;
   a bullseye feature comprising a two-dimensional array of bullseyes;
   a triangle feature comprising at least one isosceles triangle; and
   a symmetric corners feature comprising two symmetric sets of geometric shapes arranged in an L-shape.

4. The physical calibration slide of claim 1, wherein the physical calibration slide has a width of 25 mm and a length of 75 mm.

5. The physical calibration slide of claim 1, wherein the at least one set of parallel lines of the first ruling feature are angled at 95° with respect to the short axis and wherein the at least one set of parallel lines of the second ruling feature are angled at 5° with respect to the short axis.

6. The physical calibration slide of claim 1, further comprising a star target feature comprising a circle with a plurality of wedge pairs, wherein, in the star target feature, the circle comprises an etched core with a central dot.

7. The physical calibration slide of claim 6, wherein the star target feature comprises an inner circle within an outer circle.

8. The physical calibration slide of claim 1, further comprising a crosshair feature having an outer rectangular box surrounding a centered crosshair, and an offset crosshair smaller than the centered crosshair and positioned in one corner of the outer rectangular box, each of the centered crosshair and the offset crosshair include two orthogonal bisecting lines.

9. The physical calibration slide of claim 1, further comprising a resolution target feature comprised of a plurality of resolution targets for macro and micro focusing.

10. The physical calibration slide of claim 1, further comprising a resolution target comprising a two-dimensional array of bullseyes, wherein each bullseye comprises a circle with a dot in a center of the circle.

11. The physical calibration slide of claim 10, wherein the array of bullseyes comprises a 1,000×1,000 array of bullseyes.

12. The physical calibration slide of claim 1, further comprising a triangle feature, wherein the triangle feature comprises a 45° isosceles triangle.

13. The physical calibration slide of claim 1, further comprising a symmetric corners feature comprising two symmetric sets of geometric shapes arranged in an L-shape.

14. The physical calibration slide of claim 13, wherein, in the symmetric corners feature, the geometric shapes comprise dots.

15. The physical calibration slide of claim 13, wherein, in the symmetric corners feature, the geometric shapes comprise squares.

16. The physical calibration slide of claim 13, wherein, in the symmetric corners feature, each set of geometric shapes comprises a largest shape and two or more smaller shapes extending in two orthogonal directions from the largest shape, wherein the two or more smaller shapes in each direction decrease in size from closest to farthest from the largest shape.

17. The physical calibration slide of claim 1, wherein the plurality of features are etched from chromium.

18. A physical calibration slide, having a long axis along a first side and short axis along a second side, and comprising: a plurality of etched features, comprising:
- a crosshair feature having an outer rectangular box surrounding a centered crosshair, and an offset crosshair smaller than the centered crosshair and positioned in one corner of the outer rectangular box, each of the centered crosshair and the offset crosshair include two orthogonal bisecting lines, wherein the plurality of etched features further comprising two or more of:
- a slanted ruling feature comprising at least one set of parallel lines that are slanted with respect to the long axis and the short axis;
- a straight ruling feature comprising at least one set of parallel lines that are parallel to either the long axis or the short axis:
- a star target feature comprising a circle with a plurality of wedge pairs, wherein each of the plurality of wedge pairs comprises an etched wedge and a non-etched wedge;
- a clear area;
- a letter-O feature comprising a circle;
- a resolution target feature comprising one or more resolution targets;
- a bullseye feature comprising a two-dimensional array of bullseyes;
- a triangle feature comprising at least one isosceles triangle; or
- a symmetric corners feature comprising two symmetric sets of geometric shapes arranged in an L-shape.

* * * * *